United States Patent
Oota et al.

(10) Patent No.: US 10,612,656 B2
(45) Date of Patent: Apr. 7, 2020

(54) CONTROL DEVICE FOR VEHICLE AND CONTROL METHOD OF THE SAME

(71) Applicants: JATCO Ltd, Fuji-shi, Shizuoka (JP); NISSAN MOTOR CO., LTD., Yokohama-shi, Kanagawa (JP)

(72) Inventors: Yusuke Oota, Ebina (JP); Yoshimasa Nishihiro, Zama (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 91 days.

(21) Appl. No.: 16/070,736

(22) PCT Filed: Jan. 16, 2017

(86) PCT No.: PCT/JP2017/001255
§ 371 (c)(1),
(2) Date: Jul. 17, 2018

(87) PCT Pub. No.: WO2017/126475
PCT Pub. Date: Jul. 27, 2017

(65) Prior Publication Data
US 2019/0024793 A1    Jan. 24, 2019

(30) Foreign Application Priority Data

Jan. 19, 2016 (JP) ................................ 2016-007847

(51) Int. Cl.
*F16H 63/46* (2006.01)
*F16H 59/18* (2006.01)
(Continued)

(52) U.S. Cl.
CPC ............. *F16H 63/46* (2013.01); *F16H 59/18* (2013.01); *F16H 61/02* (2013.01);
(Continued)

(58) Field of Classification Search
CPC .. F16H 59/18; F16H 61/0204; F16H 61/0213; F16H 2061/0234; F16H 63/46
See application file for complete search history.

(56) References Cited

U.S. PATENT DOCUMENTS

| 5,628,705 A * | 5/1997 | Kashiwabara .... F16H 61/66259 477/46 |
| 2011/0029209 A1* | 2/2011 | Hattori ................... F16H 59/40 701/58 |

(Continued)

FOREIGN PATENT DOCUMENTS

| JP | 2011-237005 A | 11/2011 |
| JP | 2013-213557 A | 10/2013 |

(Continued)

*Primary Examiner* — Edwin A Young
(74) *Attorney, Agent, or Firm* — Foley & Lardner LLP

(57) ABSTRACT

A control device of controlling a vehicle that includes an automatic transmission is provided with a control unit. The automatic transmission includes a power transmission mechanism with an engaging element, and a variator connected in series to the power transmission mechanism. The control unit of this device completes engagement of the engaging element after downshifting of the variator is completed when at least an accelerator pedal opening becomes not smaller than a predetermined opening, during neutral running control which brings the power transmission mechanism into a power shut-off state during running of the vehicle.

10 Claims, 3 Drawing Sheets

(51) Int. Cl.
*F16H 61/02* (2006.01)
*B60W 10/06* (2006.01)
*B60W 20/30* (2016.01)

(52) U.S. Cl.
CPC ..... *F16H 61/0213* (2013.01); *F16H 61/0246* (2013.01); *F16H 61/0267* (2013.01); *B60W 10/06* (2013.01); *B60W 20/30* (2013.01); *B60W 2540/10* (2013.01)

(56) References Cited

U.S. PATENT DOCUMENTS

| | | | |
|---|---|---|---|
| 2013/0165295 A1* | 6/2013 | Kabe | F16H 61/6648 477/37 |
| 2015/0081181 A1* | 3/2015 | Takahashi | F16H 61/66272 701/51 |
| 2015/0210261 A1 | 7/2015 | Mitsuyasu | |
| 2015/0252895 A1* | 9/2015 | Inoue | F16H 61/66259 701/58 |
| 2017/0028990 A1 | 2/2017 | Yokokawa | |

FOREIGN PATENT DOCUMENTS

| | | |
|---|---|---|
| JP | 2015-117738 A | 6/2015 |
| WO | WO-2014/033947 A1 | 3/2014 |

\* cited by examiner

CONTROL DEVICE FOR VEHICLE AND CONTROL METHOD OF THE SAME

TECHNICAL FIELD

The present invention relates to a control device for a vehicle and a control method for a vehicle.

BACKGROUND ART

JP2013-213557 discloses a control device for a vehicle adapted to execute so-called sailing-stop control in which, when a predetermined condition is met, a clutch is disengaged so that an automatic transmission is brought into a neutral state (power shut-off state) and a vehicle is made to run while a driving source is stopped.

SUMMARY OF INVENTION

In a vehicle having a continuously variable transmission, if a driver has an intension of acceleration and the sailing-stop control is to be cancelled while the sailing-stop control is being executed, the continuously variable transmission is preferably downshifted. However, if the continuously variable transmission is downshifted after the sailing-stop control is cancelled and the automatic transmission is brought into a power transmitted state, there is a concern that acceleration of the vehicle is reduced.

Moreover, such delay in acceleration of the vehicle can occur not only when the sailing-stop control is cancelled but also when neutral running control in general which disengages a clutch during running and brings the automatic transmission into the neutral state is cancelled.

Thus, it is an object of the present invention to ensure acceleration when the neutral running control is cancelled.

In one aspect of the present invention, a control device of controlling a vehicle that includes an automatic transmission is provided, which automatic transmission includes a power transmission mechanism with an engaging element, and a variator connected in series to the power transmission mechanism. In this aspect, the control device includes a control unit configured to complete engagement of the engaging element after downshifting of the variator is completed when at least an accelerator pedal opening becomes not smaller than a predetermined opening, during neutral running control which brings the power transmission mechanism into a power shut-off state during running of the vehicle.

In another aspect of the present invention, a control method of controlling a vehicle that includes an automatic transmission is provided, which automatic transmission includes a power transmission mechanism with an engaging element, and a variator connected in series to the power transmission mechanism. In this aspect, engagement of the engaging element is completed after downshifting of the variator is completed when at least an accelerator pedal opening becomes not smaller than a predetermined opening, during neutral running control which brings the power transmission mechanism into a power shut-off state during running of the vehicle.

According to the aforementioned aspects, when an accelerator pedal opening is not smaller than a predetermined opening upon cancelling the neutral running control, acceleration of the vehicle can be ensured by completing engagement of an engaging element after downshifting of a variator is completed.

DESCRIPTION OF EMBODIMENTS

An embodiment of the present invention will be described below by referring to the attached drawings. In the following, a speed ratio is a value obtained by dividing a rotation speed of an input shaft of a continuously variable transmission by a rotation speed of an output shaft of the continuously variable transmission, and when the speed ratio is large, it is referred to as "the speed ratio is on a Low side", while when the speed ratio is small, it is referred to as "the speed ratio is on a High side". Moreover, to increase the speed ratio of the continuously variable transmission is referred to as "downshifting", while to decrease the speed ratio is referred to as "upshifting".

Figure 1:
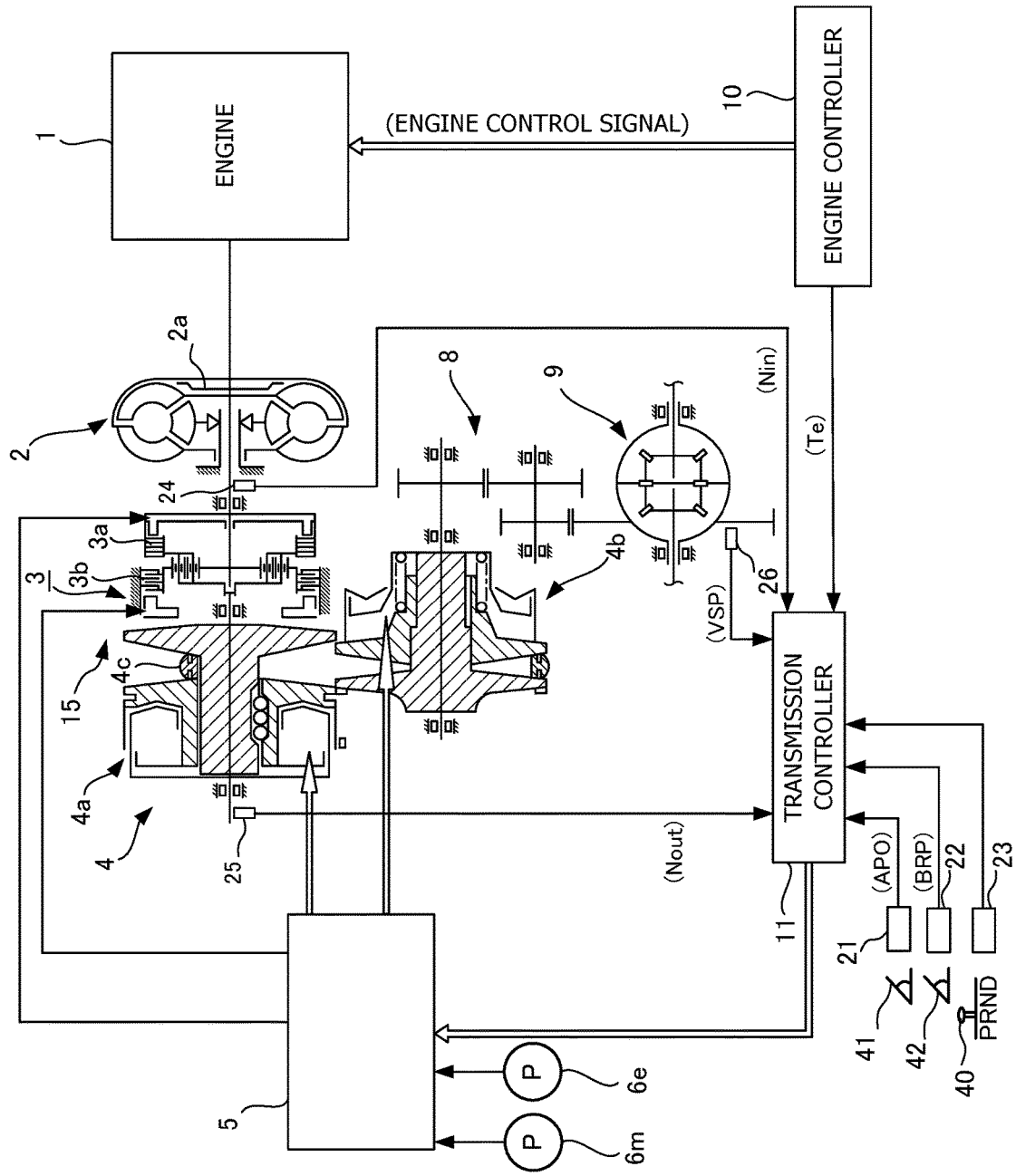
FIG. 1 is an outline configuration diagram of a vehicle according to an embodiment of the present invention.

FIG. 1 is an outline configuration diagram of a vehicle of this embodiment. The vehicle includes an engine 1, a torque converter 2, a forward/reverse switching mechanism 3 which is a power transmission mechanism, a continuously variable transmission (variator) 4, a hydraulic control circuit 5, a mechanical-driving type oil pump (hereinafter referred to as a "mechanical oil pump") 6m, an electric oil pump 6e, an engine controller 10, and a transmission controller 11. In the vehicle, rotation generated in the engine 1 is transmitted to a driving wheel, not shown, via the torque converter 2, the forward/reverse switching mechanism 3, the continuously variable transmission 4, a gear set 8, and a differential gear device 9. An automatic transmission 15 is constituted by the forward/reverse switching mechanism 3 and the continuously variable transmission 4.

The torque converter 2 has a lockup clutch 2a, and when the lockup clutch 2a is engaged, an input shaft and an output shaft of the torque converter 2 are directly coupled, and the input shaft and the output shaft are rotated at the same speed.

The forward/reverse switching mechanism 3 has a double-pinion planetary gear set as a main constituent element and couples its sun gear to the engine 1 through the torque converter 2 and couples a carrier to a primary pulley 4a. The forward/reverse switching mechanism 3 further includes a forward clutch 3a for directly coupling the sun gear and the carrier of the double-pinion planetary gear set and a reverse brake 3b for fixing a ring gear, transmits input rotation from the engine 1 via the torque converter 2 to the primary pulley 4a as it is when the forward clutch 3a is engaged, and transmits the input rotation from the engine 1 via the torque converter 2 to the primary pulley 4a under reverse speed reduction when the reverse brake 3b is engaged.

As states of the forward clutch 3a and the reverse brake 3b, there are "disengaged", "standby", "slip" and "engaged" states. These states are switched in accordance with a hydraulic pressure supplied to each piston pressure receiving chamber.

The "disengaged" is a state where the hydraulic pressure is not supplied to the forward clutch 3a, and the forward clutch 3a does not have a torque capacity, for example.

The "standby" is a state where the forward switch 3a does not have a torque capacity though the hydraulic pressure is supplied to the forward clutch 3a, for example. In the "standby" state, the forward clutch 3a is in a state immediately before it has the torque capacity.

The "slip" is a state where the hydraulic pressure is supplied to the forward clutch 3a, the forward clutch 3a has the torque capacity, and a rotation speed difference considering a speed ratio R1 of the forward/reverse switching mechanism 3 when the forward clutch 3a is engaged is generated between the input/output shafts of the forward/reverse switching mechanism 3, for example. In the "slip" state, the torque capacity is smaller than an input torque of the forward clutch 3a.

The "engaged" is a state where the hydraulic pressure is supplied to the forward clutch 3a, the forward clutch 3a has the torque capacity, and the rotation speed difference considering the speed ratio R1 of the forward/reverse switching mechanism 3 when the forward clutch 3a is engaged is not generated between the input/output shafts of the forward/reverse switching mechanism 3, for example. In the "engaged" state, the torque capacity is larger than an input torque of the forward clutch 3a. The "engaged" state includes complete engagement in which the torque capacity has an allowance for the input torque by increasing the torque capacity after the torque capacity becomes larger than the input torque of the forward clutch 3a.

The continuously variable transmission 4 includes the primary pulley 4a, a secondary pulley 4b, and a belt 4c. In the continuously variable transmission 4, the hydraulic pressure supplied to the primary pulley 4a and the hydraulic pressure supplied to the secondary pulley 4b are controlled so that a contact radius between each of the pulleys 4a and 4b and the belt 4c is changed, and a speed ratio I of the continuously variable transmission 4 (variator) is changed.

The mechanical oil pump 6m is a mechanical oil pump to which rotation of the engine 1 is input and which is driven by using a part of power of the engine 1. Oil ejected from the mechanical oil pump 6m by the driving of the mechanical oil pump 6m is supplied to the hydraulic control circuit 5. When the engine 1 is stopped, the mechanical oil pump 6m is not driven, and the oil is not ejected from the mechanical oil pump 6m.

The electric oil pump 6e is an electric-type oil pump driven by supply of electricity from a battery. By driving the electric oil pump 6e if the mechanical oil pump 6m is not driven, the oil can be supplied to the hydraulic control circuit 5 even while the engine is stopped.

The hydraulic control circuit 5 is constituted by a plurality of channels, a plurality of hydraulic actuators and the like. The hydraulic actuator is constituted by a solenoid and a hydraulic control valve. In the hydraulic control circuit 5, the hydraulic actuator is controlled on the basis of a control signal from the transmission controller 11, a supply path of the hydraulic pressure is switched, and a required hydraulic pressure is adjusted from a line pressure generated by oil ejected from the mechanical oil pump 6m and the electric oil pump 6e. The hydraulic control circuit 5 supplies the adjusted hydraulic pressure to each portion of the continuously variable transmission 4, the forward/reverse switching mechanism 3, and the torque converter 2.

The transmission controller 11 is constituted by a CPU, a ROM, a RAM and the like and controls an operation of the automatic transmission 15. In the transmission controller 11, a function of the transmission controller 11 is exerted by reading and executing a program stored in the ROM by the CPU.

To the transmission controller 11, a signal from an accelerator pedal opening sensor 21 for detecting an accelerator pedal opening APO corresponding to an operation amount of an accelerator pedal 41, a signal from a brake fluid pressure sensor 22 for detecting a brake fluid pressure BRP corresponding to an operation amount of a brake pedal 42, and a signal from an inhibitor switch 23 for detecting a position of a shift lever 40 are input. Moreover, to the transmission controller 11, a signal from an input-side rotation speed sensor 24 for detecting a rotation speed Nin of an input side (engine 1 side) of the forward/reverse switching mechanism 3, a signal from an output-side rotation speed sensor 25 for detecting a rotation speed Nout on an output side (continuously variable transmission 4 side) of the forward/reverse switching mechanism 3, a signal from a vehicle speed sensor 26 for detecting a vehicle speed VSP, a signal related to an engine torque Te from the engine controller 10 controlling an operation of the engine 1 and the like are input.

In this embodiment, if a sealing-stop condition is met during running of a vehicle, the sailing-stop control is executed in which fuel injection to the engine 1 is stopped and the engine 1 is stopped, and the forward clutch 3a and the reverse brake 3b of the forward/reverse switching mechanism 3 are disengaged, and the automatic transmission 15 is brought into the neutral state.

As a result, an inertia running distance in the state where the engine 1 is stopped is prolonged, and fuel efficiency of the engine 1 can be improved.

The sailing-stop conditions are as follows, for example:
(a) The shift lever 40 is at a D range.
(b) The vehicle speed VSP is not lower than a first predetermined vehicle speed V1.
(c) The accelerator pedal 41 has not been stepped on.
(d) The brake pedal 42 has not been stepped on.

The first predetermined vehicle speed V1 is a medium or high vehicle speed and is set in advance.

The sailing-stop condition is met when all the aforementioned (a) to (d) conditions are satisfied and is not met if any one of the aforementioned (a) to (d) is not satisfied.

If the sailing-stop condition is not met anymore during the sailing-stop control, the sailing-stop control is cancelled, the engine 1 is started, and the forward clutch 3a is engaged. That is, the sailing-stop condition is also a sailing-stop cancellation condition for canceling the sailing-stop control. The sailing-stop condition and the sailing-stop cancellation condition may be different conditions.

When the sailing-stop cancellation condition is met, the engine 1 is started, and after the forward clutch 3a is engaged, normal running control is executed. For a period from the sailing-stop cancellation condition is met until the normal running control is executed, after execution of rotation synchronization control in which the engine 1 is started and rotation speeds before and after the forward clutch 3a are synchronized, the sailing-stop cancellation control for engaging the forward clutch 3a is executed. The sailing-stop control, the rotation synchronization control, the sailing-stop cancellation control and the like are executed by the transmission controller 11 and the engine controller 10.

During the sailing-stop control, the forward/reverse switching mechanism 3 is in the power shut-off state, and the automatic transmission 15 is in the neutral state. Moreover, since the engine 1 is stopped, the mechanical oil pump 6m is not driven. Thus, during the sailing-stop control, a required hydraulic pressure is supplied to the vehicle by using the oil ejected from the electric oil pump 6e.

Figure 2:
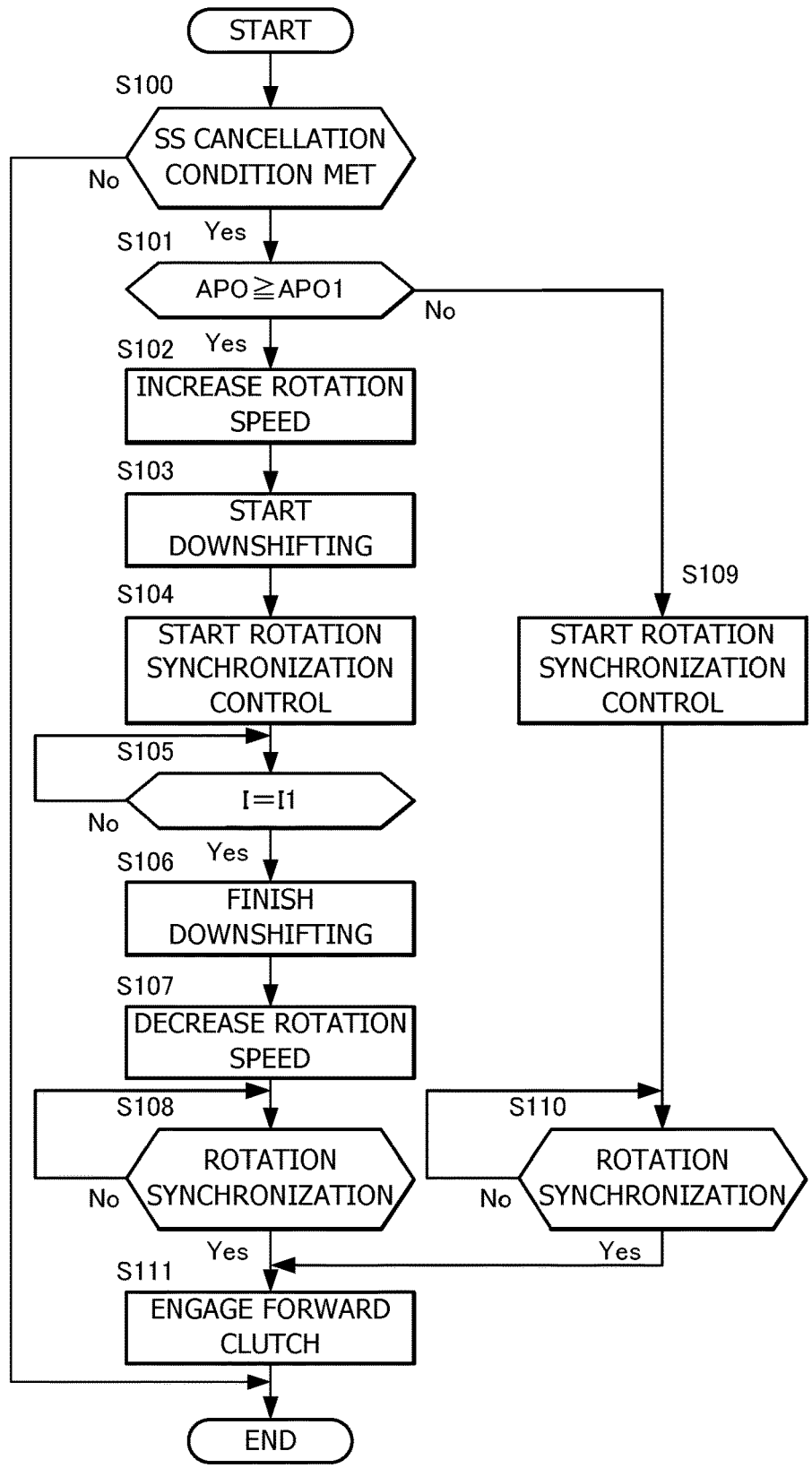
FIG. 2 is a flowchart when sailing-stop control is cancelled in the embodiment.

Subsequently, a case where the sailing-stop control is to be cancelled will be described by using a flowchart in FIG. 2. When the processing illustrated in FIG. 2 is to be started, it is assumed that the sailing-stop control is being executed.

At Step S100, the transmission controller 11 determines whether the sailing-stop cancellation condition (SS cancellation condition) is met or not. Specifically, the transmission controller 11 determines whether any one of the aforementioned (a) to (d) is not met anymore. If the sailing-stop cancellation condition is met, the processing goes to Step S101, while if the sailing-stop cancellation condition is not met, the processing this time is finished.

At Step S101, the transmission controller 11 determines whether the accelerator pedal opening APO is not smaller than a predetermined opening APO1 or not. The accelerator pedal opening APO is detected on the basis of a signal from the accelerator pedal opening sensor 21. The predetermined opening APO1 is an opening set in advance and is a value larger than zero. The predetermined opening APO1 is an opening by which determination that the acceleration intention of the driver is large can be made. If the accelerator pedal opening APO is not smaller than the predetermined opening APO1, the processing goes to Step S102. On the other hand, if the accelerator pedal opening APO is less than the predetermined opening APO1, the processing goes to Step S109.

The accelerator pedal opening APO may include a value corresponding to a throttle opening TVO. That is, the accelerator pedal opening APO includes the throttle opening TVO.

At Step S102, the transmission controller 11 controls the electric oil pump 6e, increases the rotation speed of the electric oil pump 6e, and increases an ejection amount of the electric oil pump 6e.

If the accelerator pedal opening APO is less than the predetermined opening APO1 and the acceleration intention of the driver is small, the electric oil pump 6e is controlled so that belt slippery in the continuously variable transmission 4 is not caused, and oil required for lubrication or the like is ejected. On the other hand, if the accelerator pedal opening APO is not smaller than the predetermined opening APO1 and the acceleration intention of the driver is large, the continuously variable transmission 4 is downshifted as will be described later and thus, an oil amount required in the vehicle, that is, an oil amount balance becomes large. Therefore, the transmission controller 11 heightens the rotation speed of the electric oil pump 6e and increases the ejection amount of the electric oil pump 6e.

At Step S103, the transmission controller 11 starts downshifting of the continuously variable transmission 4.

At Step S104, the engine controller 10 starts the engine 1 and starts rotation synchronization control.

At Step S105, the transmission controller 11 determines whether the continuously variable transmission 4 has carried out downshifting and the speed ratio I of the continuously variable transmission 4 becomes a predetermined speed ratio I1 or not. The speed ratio I is calculated on the basis of a signal from the output-side rotation speed sensor 25 and a signal from the vehicle speed sensor 26. The predetermined speed ratio I1 is a speed ratio set in advance and is set on the basis of the accelerator pedal opening APO, for example. If the accelerator pedal opening APO is large, it is considered that the driver desires quick acceleration. Thus, it is desirable that the speed ratio I of the continuously variable transmission 4 is brought to the Low side. When the continuously variable transmission 4 has the predetermined speed ratio I1, the processing goes to Step S106.

At Step S106, the transmission controller 11 finishes the downshifting of the continuously variable transmission 4.

At Step S107, the transmission controller 11 controls the electric oil pump 6e, decreases the rotation speed of the electric oil pump 6e, and decreases the ejection amount of the electric oil pump 6e. Specifically, the ejection amount is decreased only by the oil amount required for downshifting the continuously variable transmission 4, that is, the ejection amount increased at Step S102.

At Step S108, the transmission controller 11 determines whether rotation synchronization has been realized in the forward clutch 3a or not. Specifically, the transmission controller 11 determines whether a relationship between the rotation speed Nin on the input side of the forward/reverse switching mechanism 3 and the rotation speed Nout on the output side of the forward/reverse switching mechanism 3 satisfies an equation (1).

$$|Nin-(R1 \times Nout)| \leq N1 \qquad (1)$$

Reference character "R1" is a speed ratio of the forward/reverse switching mechanism 3 when the forward clutch 3a is engaged. Reference character "N1" is a threshold value set in advance and is a value at which determination can be made that occurrence of an engagement shock can be suppressed when the forward clutch 3a is engaged.

If the equation (1) is satisfied, the transmission controller 11 determines that rotation synchronization has been realized, while if the equation (1) is not satisfied, it determines that the rotation synchronization has not been realized. When the rotation speed Nin on the input side is heightened by the start of the engine 1, and it is determined that rotation synchronization has been realized, the processing goes to Step S111.

Instead of the equation (1), an equation (2) or the like may be used.

$$|R1-Nin/Nout| \leq N2 \qquad (2)$$

Reference character "N2" is a threshold value set in advance and is a value at which it can be determined that occurrence of an engagement shock can be suppressed when the forward clutch 3a is engaged.

At Step S109, the engine controller 10 starts the engine 1 and starts the rotation synchronization control.

At Step S101, if the accelerator pedal opening APO is less than the predetermined opening APO1, it is determined that the acceleration intention of the driver is small. Thus, at Step S109, the rotation synchronization control is started without starting the downshifting in the continuously variable transmission 4.

At Step S110, the transmission controller 11 determines whether rotation synchronization has been realized in the forward/reverse switching mechanism 3. A method for determination is the same as that at Step S108. When it is determined that the rotation synchronization has been realized, the processing goes to Step S111.

If the accelerator pedal opening APO is less than the predetermined opening APO1, by starting the rotation synchronization control without starting the downshifting in the continuously variable transmission 4, power consumption in the electric oil pump 6e is reduced without increasing the ejection amount of the electric oil pump 6e. Moreover, since the rotation speed of the electric oil pump 6e can be kept low, silence can be improved.

At Step S111, the transmission controller 11 finishes the rotation synchronization control and executes the sailing-stop cancellation control. The transmission controller 11 heightens the hydraulic pressure supplied to the forward clutch 3a and engages the forward clutch 3a.

Figure 3:
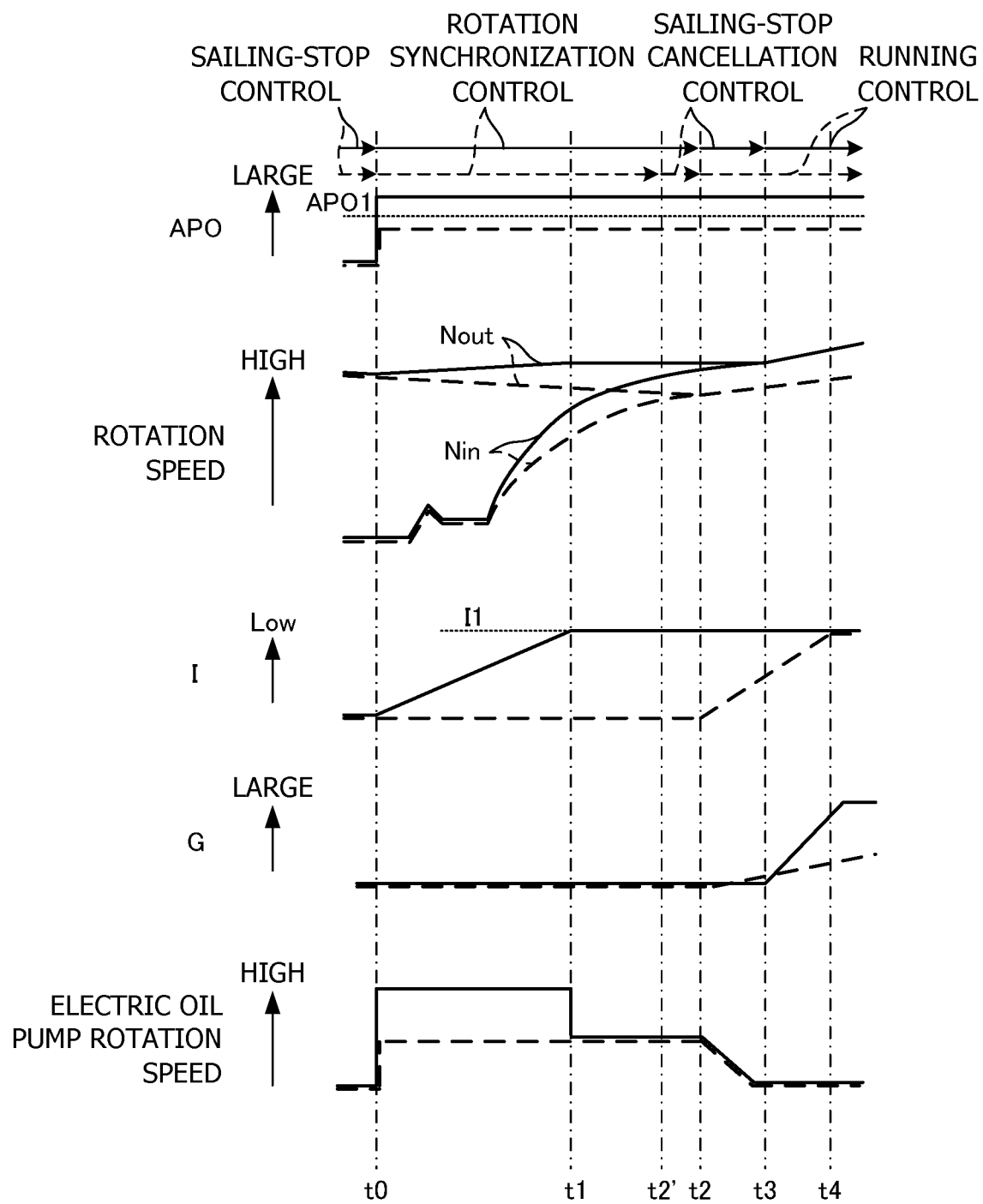
FIG. 3 is a time chart when the sailing-stop control is canceled in the embodiment.

Subsequently, a case where the sailing-stop control is cancelled by stepping on the accelerator pedal 41 will be described by using the time chart in FIG. 3. In FIG. 3, a case where the accelerator pedal opening APO is not smaller than the predetermined opening APO1 is indicated by a solid line, and a case where the accelerator pedal opening APO is less than the predetermined opening APO1 is indicated by a broken line. In FIG. 3, if the solid line and the broken line are overlapped with each other, the lines are shifted from each other for explanation in illustration.

First, the case where the accelerator pedal opening APO is less than the predetermined opening APO1 will be described.

Before time t0, the sailing-stop control is executed. During the sailing-stop control, the rotation speed of the electric oil pump 6e is lowered without changing the speed ratio I of the continuously variable transmission 4. As a result, power consumption of the electric oil pump 6e during the sailing-stop control can be suppressed, and fuel efficiency can be improved.

At the time t0, the accelerator pedal 41 is stepped on, the sailing-stop control cancellation condition is met, and the rotation synchronization control is started. As a result, the engine 1 is started, and the input-side rotation speed Nin is increased. Moreover, when the rotation synchronization control is started, in order to supply a standby pressure to the forward clutch 3a as a preparation stage for quickly engaging the forward clutch 3a, for example, the rotation speed of the electric oil pump 6e is heightened. By supplying the standby pressure to the forward clutch 3a, the rotation synchronization control is finished, and when the forward clutch 3a is to be engaged, the forward clutch 3a can be engaged quickly.

If the accelerator pedal opening APO is less than the predetermined opening APO1, the continuously variable transmission 4 is not downshifted and thus, the speed ratio I of the continuously variable transmission 4 is not changed.

At time t2', when the input/output side rotation speeds of the forward/reverse switching mechanism 3 satisfy the equation (1) and it is determined that the rotation synchronization has been realized, the rotation synchronization control is finished, and the sailing-stop cancellation control is started.

At time t2, the forward clutch 3a is engaged, the sailing-stop cancellation control is finished, the normal running control is started, and the continuously variable transmission 4 is downshifted. Here, the rotation speed of the electric oil pump 6e is gradually lowered, and the continuously variable transmission 4 is downshifted by using the oil ejected mainly from the mechanical oil pump 6m.

After the forward clutch 3a is engaged, the rotation speed of the electric oil pump 6e can be made to zero in a stepped manner, but there is a concern that the engine 1 is on the rise and the hydraulic pressure required for downshifting the continuously variable transmission 4 cannot be generated only by the oil ejected from the mechanical oil pump 6m. Thus, by gradually lowering the rotation speed of the electric oil pump 6e, shortage of the hydraulic pressure to be supplied to the continuously variable transmission 4 is suppressed, and the continuously variable transmission 4 can be reliably downshifted.

At time t4, the downshifting of the continuously variable transmission 4 is finished.

As described above, when the sailing-stop control cancellation condition is met, and the accelerator pedal opening APO is less than the predetermined opening APO1, the downshifting of the continuously variable transmission 4 is completed after the engagement of the forward clutch 3a is completed.

If the accelerator pedal opening APO is less than the predetermined opening APO1, since the running control is started in a state where the speed ratio I of the continuously variable transmission 4 is on the High side, an acceleration G of the vehicle is small.

Subsequently, the case where the accelerator pedal opening APO is not smaller than the predetermined opening APO1 will be described.

At the time t0, the accelerator pedal 41 is stepped on, the sailing-stop control cancellation condition is met, and the rotation synchronization control is started. As a result, the engine 1 is started, and the input-side rotation speed Nin is increased. Moreover, since the rotation speed of the electric oil pump 6e becomes higher than the case where the accelerator pedal opening APO is less than the predetermined opening APO1, the continuously variable transmission 4 can be downshifted by using the oil ejected from the electric oil pump 6e. Then, the continuously variable transmission 4 is downshifted by using the oil ejected from the electric oil pump 6e, and the speed ratio I is changed to the Low side. Since the continuously variable transmission 4 is downshifted, the rotation speed Nout on the output side of the forward/reverse switching mechanism 3 becomes high.

At time t1, when the speed ratio I of the continuously variable transmission 4 becomes the predetermined speed ratio I1, the downshifting is finished, and the rotation speed of the electric oil pump 6e is decreased.

At the time t2, when it is determined that the input/output side rotation speeds of the forward/reverse switching mechanism 3 satisfy the equation (1) and it is determined that the rotation synchronization has been realized, the rotation synchronization control is finished, and the sailing-stop cancellation control is started.

At time t3, the forward clutch 3a is engaged, the sailing-stop cancellation control is finished, and the normal running control is started.

As described above, if the sailing-stop control cancellation condition is met and the accelerator pedal opening APO is not smaller than the predetermined opening APO1, the engagement of the forward clutch 3a is completed after the downshifting of the continuously variable transmission 4 is completed.

If the accelerator pedal opening APO is not smaller than the predetermined opening APO1, the output-side rotation speed Nout of the forward/reverse switching mechanism 3 becomes high due to the downshifting of the continuously variable transmission 4. Thus, as compared with the case where the accelerator pedal opening APO is less than the predetermined opening degree APO1, the timing when the engagement of the forward clutch 3a is completed and the running control is started is delayed.

However, since the forward clutch 3a is engaged and the running control is started in the state where the input-side rotation speed Nin of the forward/reverse switching mechanism 3 is high, that is, the rotation speed of the engine 1 is high, a region where the torque of the engine 1 is high can be used, the acceleration G of the vehicle becomes large, and the vehicle can be accelerated quickly.

An effect of the embodiment of the present invention will be described.

If the sailing-stop control cancellation condition is met, the accelerator pedal opening APO is not smaller than the predetermined opening APO1 and the acceleration request by the driver is large, the engagement of the forward clutch 3a is completed after the downshifting of the continuously variable transmission 4 is completed. As a result, the speed ratio I of the continuously variable transmission 4 is on the Low side when the forward clutch 3a is engaged, acceleration performances of the vehicle become high, and acceleration response of the vehicle can be improved.

If the sailing-stop control cancellation condition is met, the accelerator pedal opening APO is less than the predetermined opening APO1, and the acceleration request by the driver is small, the downshifting of the continuously variable transmission 4 is completed after the engagement of the forward clutch 3a is completed. As a result, the hydraulic balance when the sailing-stop control is to be cancelled can be made small, and a rise of the rotation speed of the electric oil pump 6e can be suppressed. Therefore, the power consumption in the electric oil pump 6e can be suppressed, and the fuel efficiency can be improved.

If the sailing-stop control cancellation condition is met and the engagement of the forward clutch 3a is to be completed after the downshifting of the continuously variable transmission 4 is completed, the rotation speed of the electric oil pump 6e is made higher than the case where the downshifting of the continuously variable transmission 4 is to be completed after the engagement of the forward clutch 3a is completed. As a result, if the engagement of the forward clutch 3a is to be completed after the downshifting of the continuously variable transmission 4 is completed, the downshifting of the continuously variable transmission 4 can be carried out quickly, and the acceleration response of the vehicle can be improved. Moreover, if the downshifting of the continuously variable transmission 4 is to be completed after the engagement of the forward clutch 3a is completed, by lowering the rotation speed of the electric oil pump 6e, the power consumption of the electric oil pump 6e can be suppressed, and the fuel efficiency can be improved.

During the sailing-stop control, the fuel efficiency can be improved by stopping the engine 1. When the sailing-stop control cancellation condition is met, the oil amount required for the vehicle can be borne by using the oil ejected from the mechanical oil pump 6m by starting the engine 1. However, it takes time until the oil ejected from the mechanical oil pump 6m can bear the oil amount required for the vehicle. Thus, if the sailing-stop control cancellation condition is met and the accelerator pedal opening APO is not smaller than the predetermined opening APO1, the continuously variable transmission 4 is downshifted by using the oil ejected from the electric oil pump 6e. As a result, the downshifting of the continuously variable transmission 4 after the sailing-stop control cancellation condition is met can be carried out quickly, and the acceleration response of the vehicle can be improved.

In the aforementioned embodiment, the accelerator pedal opening APO and the predetermined opening APO1 are compared, and if the accelerator pedal opening APO is not smaller than the predetermined opening APO1, it is determined that the driver has an intention of acceleration, but it may be determined that the driver has the intention of acceleration when the accelerator pedal 41 is stepped on. That is, if the accelerator pedal 41 is stepped on and the sailing-stop control cancellation condition is met, the engagement of the forward clutch 3a is completed after the downshifting of the continuously variable transmission 4 is completed regardless of a size of the accelerator pedal opening APO. As a result, the acceleration response of the vehicle can be improved.

In the aforementioned embodiment, when the sailing-stop control cancellation condition is met, timing of completion of the downshifting of the continuously variable transmission 4 and completion of the engagement of the forward clutch 3a is changed in accordance with the accelerator pedal opening APO, but this is not limiting.

For example, if the sailing-stop control is to be finished by stepping on the brake pedal 42, the downshifting of the continuously variable transmission 4 may be completed after the engagement of the forward clutch 3a is completed. If the brake pedal 42 is stepped on, it is considered that the driver does not have the acceleration intention, and the acceleration request is low. Thus, in such a case, by completing the downshifting of the continuously variable transmission 4 after the engagement of the forward clutch 3a is completed, the power consumption in the electric oil pump 6e is suppressed, and the fuel efficiency can be improved.

Moreover, if the vehicle speed VSP is less than a first predetermined vehicle speed (predetermined vehicle speed) V1, and the sailing-stop control is to be finished, the downshifting of the continuously variable transmission 4 may be completed after the engagement of the forward clutch 3a is completed. When the vehicle speed VSP is less than the first predetermined vehicle speed V1, it is considered that the acceleration request is low. Thus, in such a case, by completing the downshifting of the continuously variable transmission 4 after the engagement of the forward clutch 3a is completed, the power consumption in the electric oil pump 6e is suppressed, and the fuel efficiency can be improved.

Even if the brake pedal 42 is stepped on or the vehicle speed VSP becomes less than the first predetermined vehicle speed V1, the engagement of the forward clutch 3a may be completed after the downshifting of the continuously variable transmission 4 is completed in preparation for the acceleration request by the driver.

In the aforementioned embodiment, the automatic transmission 15 having the forward/reverse switching mechanism 3 arranged on a front stage or on an upstream side of the continuously variable transmission (variator) 4 is described, but it may be applied to an automatic transmission having a sub-transmission mechanism arranged on a rear stage or on a downstream side of the continuously variable transmission 4. A power transmission mechanism is a concept including the forward/reverse switching mechanism 3, the sub-transmission mechanism, and other power transmission mechanisms. Moreover, a main transmission mechanism constituting the automatic transmission 15 is not limited to the belt continuously variable transmission 4 but may be a toroidal continuously variable transmission, and it is not limited to the continuously variable transmission but may be a stepped transmission.

In order to change the speed ratio I in the continuously variable transmission 4, the primary pulley 4a and the secondary pulley 4b need to be rotated. If the power transmission mechanism is located on the downstream side from the continuously variable transmission 4, that is, on the driving wheel side in the power transmission path, and the power transmission mechanism is in the power shut-off state by execution of the sailing-stop control, in order to change the speed ratio I of the continuously variable transmission 4, each of the pulleys 4a and 4b needs to be rotated by the engine 1. On the other hand, if the power transmission mechanism is located on the upstream side from the continuously variable transmission 4, that is, on the engine 1 side, and the power transmission mechanism is in the power shut-off state by the execution of the sailing-stop control, each of the pulleys 4a and 4b is rotated together with the driving wheel. Therefore, if the power transmission mechanism is on the upstream side from the continuously variable transmission 4, even if the power transmission mechanism is in the power shut-off state, the speed ratio I of the continuously variable transmission 4 can be changed. As described above, the power transmission mechanism is preferably arranged on the upstream side of the continuously variable transmission 4.

In the aforementioned embodiment, the sailing-stop control as an example of neutral running control is described. However, the neutral running control may be sailing control or coast stop control, for example, other than the sailing-stop control. That is, during the neutral running in which the engine stop condition is met, the engine 1 as a driving source is stopped during the running, and the automatic transmission 15 is in the neutral state in the running, if a neutral cancellation condition is met, the engine 1 is started, and the forward clutch 3*a* is engaged, the aforementioned control can be applied.

It is possible that the engine 1 is not stopped during the neutral running control. However, if the continuously variable transmission 4 is configured not to be shifted during the neutral running control, the oil amount required in the vehicle can be made smaller, the engine 1 can be stopped, and the fuel efficiency can be improved. Thus, in this embodiment, the fuel efficiency is improved by stopping the engine 1 by the engine controller 10 during the neutral running control.

If the engine 1 is operated during the neutral running control, the downshifting of the continuously variable transmission 4 may be completed by using the oil ejected from the mechanical oil pump 6*m*.

The coast stop control is executed by the transmission controller 11 and the engine controller 10 when the coast-stop forming condition is met. The coast-stop forming conditions are the following (a) to (d), for example:

(a) The shift lever 40 is at the D range.
(b) The vehicle speed VSP is less than a second predetermined vehicle speed V2.
(c) The accelerator pedal 41 has not been stepped on.
(d) The brake pedal 42 has been stepped on.

Here, the second predetermined vehicle speed V2 is a low vehicle speed and is a vehicle speed not higher than a vehicle speed at which the lockup clutch 2*a* is disengaged.

The coast-stop forming condition is met when all the conditions (a) to (d) are satisfied and is not met if any one of (a) to (d) is not satisfied. Moreover, the coast-stop cancellation condition is that any one of (a) to (d) is not met during the coast-stop control, for example, but the coast-stop forming condition and the coast-stop cancellation condition may be different conditions.

The sailing control is executed by the transmission controller 11 and the engine controller 10 when the sailing forming condition is met. The sailing forming conditions are the following (a) to (d), for example:

(a) The shift lever 40 is at the D range.
(b) The vehicle speed VSP is not lower than the second predetermined vehicle speed V2.
(c) The accelerator pedal 41 has not been stepped on.
(d) The brake pedal 42 has not been stepped on.

The sailing forming condition is met when all the conditions (a) to (d) are satisfied and is not met if any one of (a) to (d) is not satisfied. Moreover, the sailing cancellation condition is that any one of (a) to (d) is not met during the sailing control, for example, but the sailing forming condition and the sailing cancellation condition may be different conditions.

In the aforementioned embodiment, the case where the engine 1 is the driving source is described. However, the driving source is not limited to the engine 1 but may be a motor or may be a combination of the engine 1 and the motor, for example.

In the aforementioned embodiment, the case where the transmission controller 11 and the engine controller 10 are constituted as separate controllers is described. However, functions of the transmission controller 11 and the engine controller 10 may be integrated and constituted as a single controller. Moreover, at least either one of the transmission controller 11 or the engine controller 10 may be constituted by a plurality of controllers.

Some aspects of the present invention derived from the aforementioned explanation other than those described in claims will be cited below.

A control device for a vehicle that includes:
a driving source; and
an automatic transmission connected to the driving source, the automatic transmission having a power transmission mechanism with an engaging element disposed capable of shutting off transmission of power through the automatic transmission, and a variator connected in series to the power transmission mechanism, wherein
engagement of the engaging element is completed after downshifting of the variator is completed to bring about a power transmitted state when cancelling neutral running control for running with the power transmission mechanism in a power shut-off state.

A control device for a vehicle further including means of detecting an accelerator pedal opening, wherein
upon cancelling the neutral running control, the engagement of the engaging element is completed after the downshifting of the variator is completed if the accelerator pedal opening is not lower than a predetermined opening, whereas the downshifting of the variator is completed after the engagement of the engaging element is completed if the accelerator pedal opening is less than the predetermined opening.

A control device for an automatic transmission connected to a driving source, the automatic transmission including a power transmission mechanism with an engaging element disposed capable of shutting off transmission of power through the automatic transmission, and a variator connected in series to the power transmission mechanism, wherein
engagement of the engaging element is completed after downshifting of the variator is completed to bring about a power transmitted state when cancelling neutral running control for running with the power transmission mechanism in a power shut-off state.

A control device for an automatic transmission further including means of detecting an accelerator pedal opening, wherein
upon cancelling the neutral running control, the engagement of the engaging element is completed after the downshifting of the variator is completed if the accelerator pedal opening is not lower than a predetermined opening, whereas the downshifting of the variator is completed after the engagement of the engaging element is completed if the accelerator pedal opening is less than the predetermined opening.

The embodiment of the present invention has been described above, but the explanation of the aforementioned embodiment merely illustrates a part of an application example of the present invention and is not intended to limit the technical scope of the present invention to the specific configuration of the aforementioned embodiment.

This application claims the priority based on Japanese Patent Application No. 2016-007847 filed with the Japanese Patent Office on Jan. 19, 2016, entire of which is incorporated herein by reference.

The invention claimed is:

1. A control device of controlling a vehicle that includes an automatic transmission having:
   a power transmission mechanism having an engaging element;
   a variator connected in series to the power transmission mechanism; and
   an electric oil pump, the control device comprising:
   a control unit configured to complete engagement of the engaging element after downshifting of the variator is completed when at least an accelerator pedal opening becomes not smaller than a predetermined opening, during neutral running control which brings the power transmission mechanism into a power shut-off state during running of the vehicle, wherein
   the control unit makes a rotation speed of the electric oil pump higher upon cancelling the neutral running control when engagement of the engaging element is completed after downshifting of the variator is completed, compared to a case where the downshifting of the variator is completed after the engagement of the engaging element is completed.

2. The control device according to claim 1, wherein
   the vehicle includes a driving source;
   the automatic transmission includes a mechanical oil pump driven by the driving source, and
   the control unit:
      stops the driving source during the neutral running control; and
      starts engagement of the engaging element after starting the driving source when cancelling the neutral running control.

3. The control device according to claim 1, wherein
   the control unit completes downshifting of the variator after engagement of the engaging element is completed when cancelling the neutral running control under the condition that the accelerator pedal opening is less than the predetermined opening.

4. The control device according to claim 1, wherein
   the control unit completes downshifting of the variator after engagement of the engaging element is completed when a brake pedal is depressed during the neutral running control.

5. The control device according to claim 1, wherein
   the control unit completes downshifting of the variator after engagement of the engaging element is completed when a vehicle speed becomes less than a predetermined vehicle speed during the neutral running control.

6. A control device of controlling a vehicle that includes an automatic transmission having:
   a power transmission mechanism having an engaging element; and
   a variator connected in series to the power transmission mechanism, the control device comprising:
   a control unit configured to complete engagement of the engaging element after downshifting of the variator is completed when at least an accelerator pedal opening becomes not smaller than a predetermined opening, during neutral running control which brings the power transmission mechanism into a power shut-off state during running of the vehicle, wherein
   the control unit completes downshifting of the variator after engagement of the engaging element is completed when cancelling the neutral running control under the condition that the accelerator pedal opening is less than the predetermined opening.

7. A control method of controlling a vehicle that includes an automatic transmission having:
   a power transmission mechanism having an engaging element;
   a variator connected in series to the power transmission mechanism; and
   an electric oil pump, the control method comprising:
   completing engagement of the engaging element after downshifting of the variator is completed when at least an accelerator pedal opening becomes not smaller than a predetermined opening, during neutral running control which brings the power transmission mechanism into a power shut-off state during running of the vehicle, wherein
   a rotation speed of the electric oil pump is made higher upon cancelling the neutral running control when engagement of the engaging element is completed after downshifting of the variator is completed, compared to a case where the downshifting of the variator is completed after the engagement of the engaging element is completed.

8. A control method of controlling a vehicle that includes an automatic transmission having:
   a power transmission mechanism having an engaging element; and
   a variator connected in series to the power transmission mechanism, the control method comprising:
   completing engagement of the engaging element after downshifting of the variator is completed when at least an accelerator pedal opening becomes not smaller than a predetermined opening, during neutral running control which brings the power transmission mechanism into a power shut-off state during running of the vehicle; and
   completing downshifting of the variator after engagement of the engaging element is completed when cancelling the neutral running control under the condition that the accelerator pedal opening is less than the predetermined opening.

9. A control device of controlling a vehicle that includes an automatic transmission having:
   a power transmission mechanism having an engaging element;
   a variator connected in series to the power transmission mechanism; and
   an electric oil pump, the control device comprising:
   means for controlling the power transmission mechanism so that engagement of the engaging element is completed after downshifting of the variator is completed when at least an accelerator pedal opening becomes not smaller than a predetermined opening, during neutral running control which brings the power transmission mechanism into a power shut-off state during running of the vehicle; and
   means for controlling the electric oil pump so that a rotation speed of the electric oil pump is made higher upon cancelling the neutral running control when engagement of the engaging element is completed after downshifting of the variator is completed, compared to a case where the downshifting of the variator is completed after the engagement of the engaging element is completed.

10. A control device of controlling a vehicle that includes an automatic transmission having:

a power transmission mechanism having an engaging element; and a variator connected in series to the power transmission mechanism, the control device comprising:

means for controlling the power transmission mechanism so that engagement of the engaging element is completed after downshifting of the variator is completed when at least an accelerator pedal opening becomes not smaller than a predetermined opening, during neutral running control which brings the power transmission mechanism into a power shut-off state during running of the vehicle; and means for controlling the variator so that downshifting of the variator is completed after engagement of the engaging element is completed when cancelling the neutral running control under the condition that the accelerator pedal opening is less than the predetermined opening.

\* \* \* \* \*